(12) United States Patent
Borse et al.

(10) Patent No.: US 10,696,472 B2
(45) Date of Patent: Jun. 30, 2020

(54) SINGLE SERVE BEVERAGE CONTAINER

(71) Applicants: Joseph Borse, Chicago, IL (US); Michael Borse, Western Springs, IL (US); Robert J. Borse, Chicago, IL (US)

(72) Inventors: Joseph Borse, Chicago, IL (US); Michael Borse, Western Springs, IL (US); Robert J. Borse, Chicago, IL (US)

( * ) Notice: Subject to any disclaimer, the term of this patent is extended or adjusted under 35 U.S.C. 154(b) by 173 days.

(21) Appl. No.: 15/966,453

(22) Filed: Apr. 30, 2018

(65) Prior Publication Data

US 2019/0329969 A1   Oct. 31, 2019

(51) Int. Cl.
| B65D 85/804 | (2006.01) |
| B29C 51/08 | (2006.01) |
| B29L 31/00 | (2006.01) |
| B29K 23/00 | (2006.01) |

(52) U.S. Cl.
CPC ........ B65D 85/8043 (2013.01); B29C 51/082 (2013.01); B65D 85/804 (2013.01); *B29K 2023/12* (2013.01); *B29L 2031/7132* (2013.01)

(58) Field of Classification Search
CPC ............ B65D 85/8043; B65D 85/8046; B65D 85/808; B65D 2565/385; B65D 2081/002; B65D 2081/004; B65D 2081/007; B65D 85/804
USPC .............................................. 426/77; 99/295
See application file for complete search history.

(56) References Cited

U.S. PATENT DOCUMENTS

| 5,840,189 A | 11/1998 | Sylvan et al. |
| D474,110 S | 5/2003 | Sweeney |
| D686,916 S | 7/2013 | O'Brien |
| D700,839 S | 3/2014 | O'Brien et al. |
| 9,120,617 B2 | 9/2015 | Beer |
| 9,248,955 B2 | 2/2016 | Aardenburg |
| 9,260,239 B2 | 2/2016 | Amrein et al. |
| 9,555,957 B2 | 1/2017 | Winkler et al. |
| 9,840,365 B2 | 12/2017 | Norton et al. |
| 2005/0287251 A1 | 12/2005 | Lazaris et al. |

(Continued)

FOREIGN PATENT DOCUMENTS

| WO | 2014/033344 A1 | 3/2014 |
| WO | 2014/191044 A1 | 12/2014 |
| WO | 2016/193381 A1 | 12/2016 |

OTHER PUBLICATIONS

100 Pack; disposable K-cup, single serve coffee pod, 2.0 compatible KC100-ORG) retrieved from https:www.staples.com/100-Pack-disposable-K-Cu~single-serve-coffee-pod-2-0-compatible-KCD100-0RG/product_1798307.

(Continued)

*Primary Examiner* — King M Chu
(74) *Attorney, Agent, or Firm* — McDonnell Boehnen Hulbert & Berghoff LLP

(57) ABSTRACT

A container including a side wall having a hollow interior, an outwardly extending flange positioned above an upper end of the side wall, a lower end of the side wall having a first wall positioned thereon, a second wall extending upwardly from the first wall into the hollow interior of the side wall, a third wall extending inwardly and downwardly from the second wall, and a base extending inwardly from the third wall. A method of thermoforming the beverage container using a thermoforming operation is also provided.

24 Claims, 15 Drawing Sheets

(56) References Cited

U.S. PATENT DOCUMENTS

| | | |
|---|---|---|
| 2006/0236871 A1* | 10/2006 | Ternite .............. B65D 85/8043 99/295 |
| 2013/0213240 A1 | 8/2013 | O'Brien et al. |
| 2013/0340626 A1 | 12/2013 | Oh |
| 2014/0004231 A1* | 1/2014 | Norton .............. B65D 85/8043 426/112 |
| 2014/0037803 A1 | 2/2014 | Hansen |
| 2014/0196608 A1* | 7/2014 | Amrein ................ A47J 31/407 99/295 |
| 2014/0234494 A1 | 8/2014 | Doglioni Majer |
| 2015/0175347 A1 | 6/2015 | Empl |
| 2015/0208852 A1 | 7/2015 | Doglioni Majer |
| 2015/0230652 A1 | 8/2015 | Chalk et al. |
| 2016/0338527 A1 | 11/2016 | Burrows |
| 2017/0129692 A1 | 5/2017 | Ayaroglu et al. |
| 2017/0303712 A1 | 10/2017 | Pisarevsky |

OTHER PUBLICATIONS

Fixed1t Money Saving Tips: ALDI Pod Coffee Machine and Coffee Capsules Super Deal retrieved from https://fixed1t-money-saving-tips.blogspot.com/2016/03/aldi-pod-coffee-machine-and-coffee.html.
Keurig Single Serve Coffee Makers at ChefsCornerStore.com retrieved from http://www.chefscornerstore.com/keurig-coffee-makers.html.

* cited by examiner

SINGLE SERVE BEVERAGE CONTAINER

BACKGROUND

The present application generally relates to the field of single serve beverage containers. In recent years, there has been a trend to provide consumers with a beverage dispenser that utilizes single serve beverage containers. For example, coffee makers have been developed in which a consumer selects a desired beverage such as coffee, tea, or cocoa which is contained in a pod or capsule. The pod or capsule may contain coffee grounds, tea leaves, or cocoa powder as examples. The pod is placed in a beverage dispenser, and is pierced with a sharp implement and hot water flows through the pod or capsule mixing with the contents of the pod to brew a selected beverage.

Typically, such pods or capsules are made of a plastic material that includes polystyrene, and the pods or capsules are hollow and contain the desired beverage therein. When the pod or capsule is pierced to allow for a flow of hot water therethrough, the pod or capsule undergoes forces which may cause the pod or capsule to crumple or compress, which may result in undesirable cracks in the wall thereof allowing coffee grounds or other contents to seep through the wall of the pod or capsule into a cup positioned on the beverage dispenser beneath the pod or capsule. Therefore, the material used to make the pod or capsule needs to be strong enough to withstand the forces experienced during the piercing process so that it does not get damaged and crack under the forces.

The pods or capsules have heretofore typically been made with a plastic that includes polystyrene, resulting in a pod or capsule which is generally not easily recyclable. As the prevalence of single serve beverage containers has increased, environmental concerns regarding the landfilling of the used pods or capsules has increased as well. In an effort to produce a more environmentally friendly pod or capsule, efforts have been made to provide a pod or capsule that is more easily recycled. Polypropylene may provide a material that may be used to replace polystyrene-containing plastics. However, polypropylene is not as rigid as polystyrene and is more susceptible to being damaged during the piercing process.

In view of the foregoing, it would be desirable to provide a single serve pod or capsule that could be made of, or contain, polypropylene to provide a more easily recyclable pod or capsule. In addition, it would be desirable to provide a single serve pod or capsule that could be made of or contain polypropylene or other rigid plastic that can be formed using a thermoforming process and includes a configuration that achieves a desired strength and rigidity to withstand the piercing process.

SUMMARY

The present embodiments are directed to a single serve pod or capsule (hereinafter referred to as a "capsule" or "beverage container") that has a configuration that provides for sufficient strength and rigidity during the piercing process. In particular, the capsule is hollow and adapted to contain coffee grounds, or other contents. The capsule includes an upper flange section and a downwardly extending side wall that encircles the hollow interior of the capsule. The base of the capsule is provided with a configuration to provide increased strength and rigidity to withstand the forces encountered during the piercing process. In particular, the lower end of the side wall includes a rim having a double outer wall. The double outer wall includes a first wall that is the lower end of the side wall, and the second wall extends upwardly inside an inner surface of the first wall. In some embodiments the first wall may be formed with no gap between the first and second walls, although in other embodiments a gap between the first and second walls may be provided.

In addition, in some embodiments a third wall extends downwardly from the second wall towards the interior of the capsule and extends to a base of the capsule. The third wall may include spaced ribs that extend toward the first and second walls. The ribs may be provided such that they do not extend all of the way to the first and second walls, although in other embodiments the ribs may extend the entire distance between the third wall and the first wall with gaps between the third and second walls extending between the ribs.

In addition, the base of the capsule may be provided with a series of spaced ridges that extend upwardly from a center of the base. The use of a double outer wall and ridges on the center of the base advantageously provide increased strength and rigidity to the capsule to withstand the forces encountered during the piercing process. The ribs extending from the third wall also impart additional strength and rigidity to the capsule. In addition, a capsule having the disclosed configuration can be made of a plastic containing polypropylene, or other rigid plastic, and formed using a thermoforming process. As a result, the disclosed capsule design provides for a more environmentally friendly capsule design and may advantageously be formed using a thermoforming process.

In one aspect, a container is provided including a side wall having a hollow interior, an outwardly extending flange positioned above an upper end of the side wall, a first wall, a second wall, and a third wall positioned on a bottom of the container, wherein the first wall is positioned on a lower end of the side wall, wherein the second wall extends upwardly from the first wall into the hollow interior of the side wall, wherein the third wall extends inwardly and downwardly from the second wall, and a base extending inwardly from the third wall.

In some embodiments there is no gap between the second wall and an inner surface of the first wall, wherein in others a gap exists between the first wall and the second wall. In addition, a gap may exist between the second wall and the third wall that extends around an entire area between the second wall and the third wall. The container may be formed of a plastic made of or containing polypropylene and may be formed through a thermoforming operation. Other rigid plastic materials such as PET may also be used.

In another embodiment, a plurality of spaced apart ribs extend from the third wall to the first wall and span across an entire distance between the third wall and the second wall, wherein a gap exists between the second wall and the third wall that extends between the plurality of spaced apart ribs. In addition, a plurality of ridges may be provided that extend upwardly from a central portion of the base into the hollow interior of the side wall.

In another aspect, a method of forming a container having a side wall having a hollow interior, an outwardly extending flange positioned above an upper end of the side wall, a first wall, a second wall, and a third wall positioned on a bottom of the container, wherein the first wall is positioned on a lower end of the side wall, wherein the second wall extends upwardly from the first wall into the hollow interior of the side wall, wherein the third wall extends inwardly and downwardly from the second wall, and a base extending inwardly from the third wall is provided, including the steps of (i) performing a first thermoforming step on a sheet of plastic material to form the side wall, the first wall and the base; and (ii) following the first thermoforming step with a second thermoforming step to form the second wall and the third wall.

BRIEF DESCRIPTION OF THE DRAWINGS

Exemplary embodiments of the invention are described herein with reference to the drawings, wherein like parts are designated by like reference numerals, and wherein.

DETAILED DESCRIPTION

Example embodiments have been described above. Those skilled in the art will understand that changes and modifications may be made to the described embodiments without departing from the true scope of the present invention, which is defined by the claims.

Figure 1A:
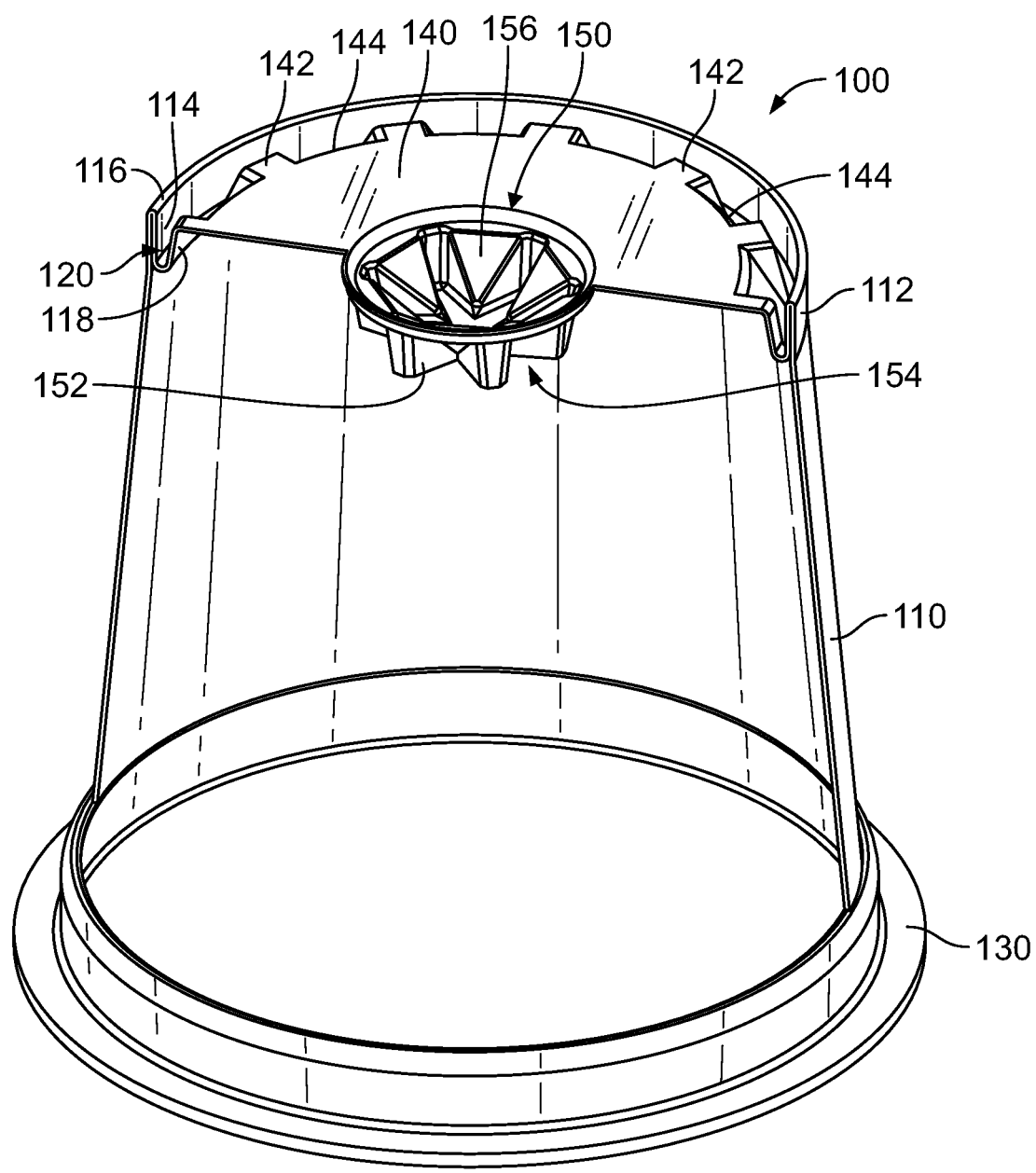
FIG. 1A is a perspective cutaway view of beverage container 100, according to an example embodiment.
Figure 1B:
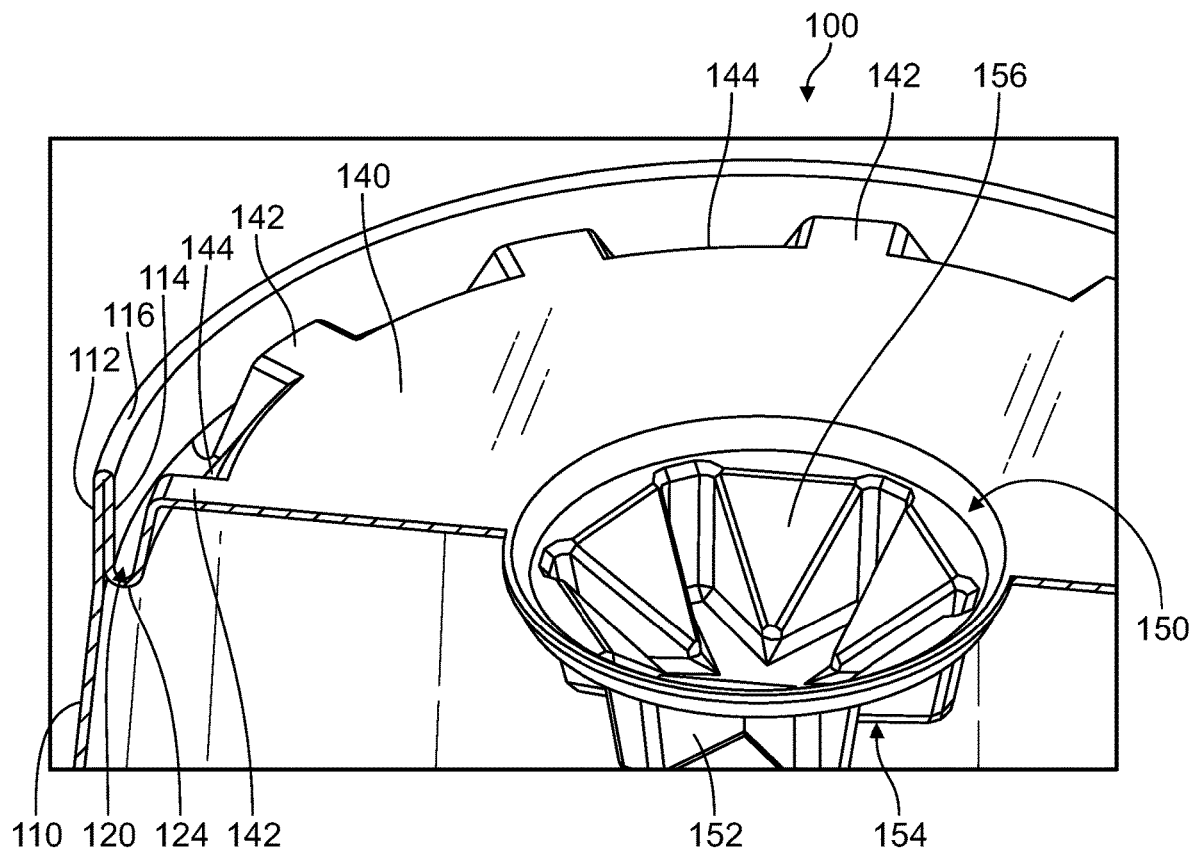
FIG. 1B is a close up view of the beverage container 100 shown in FIG. 1A.
Figure 1C:
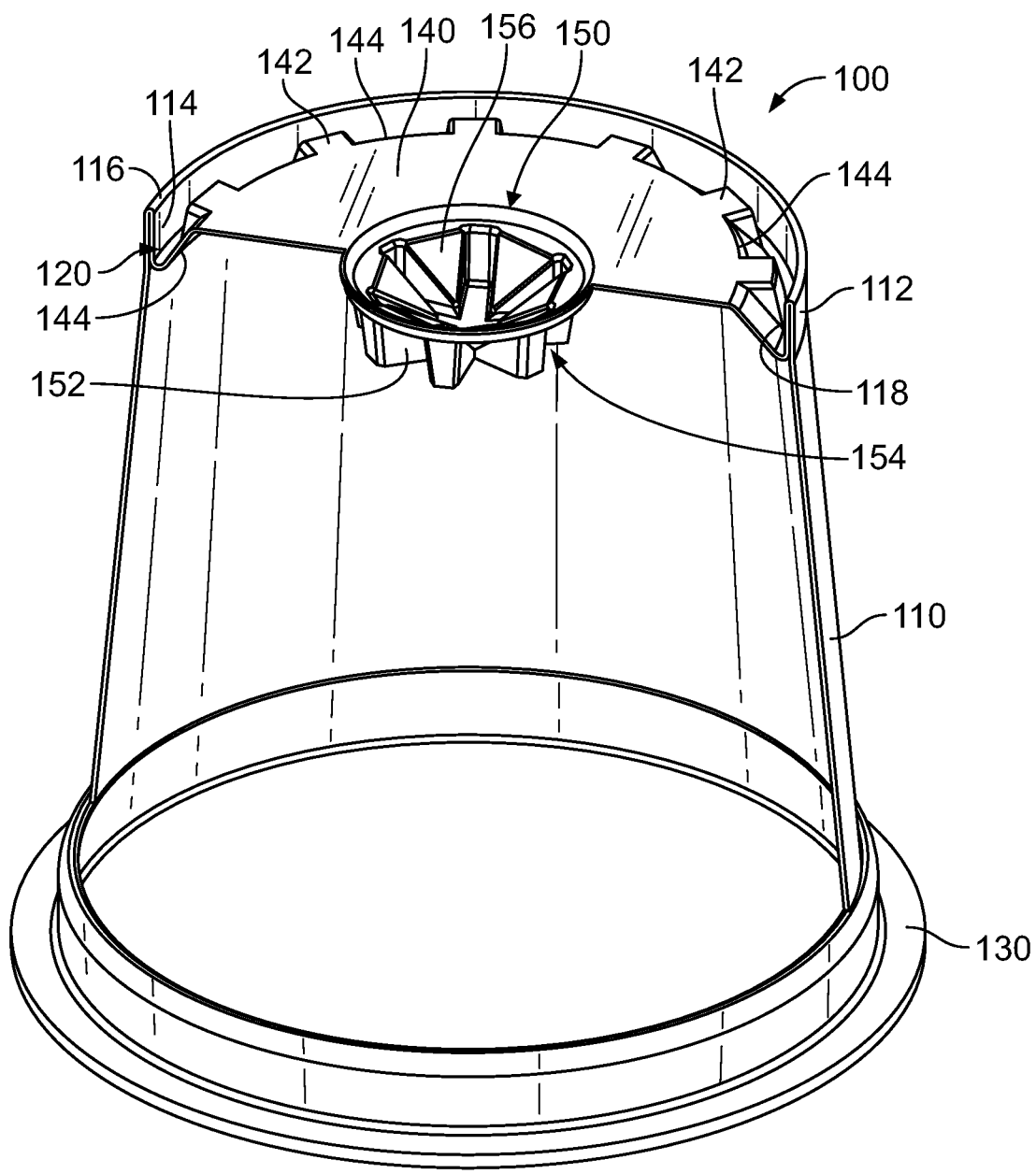
FIG. 1C is a another perspective cutaway view of beverage container 100 shown in FIGS. 1A and 1B.
Figure 1D:
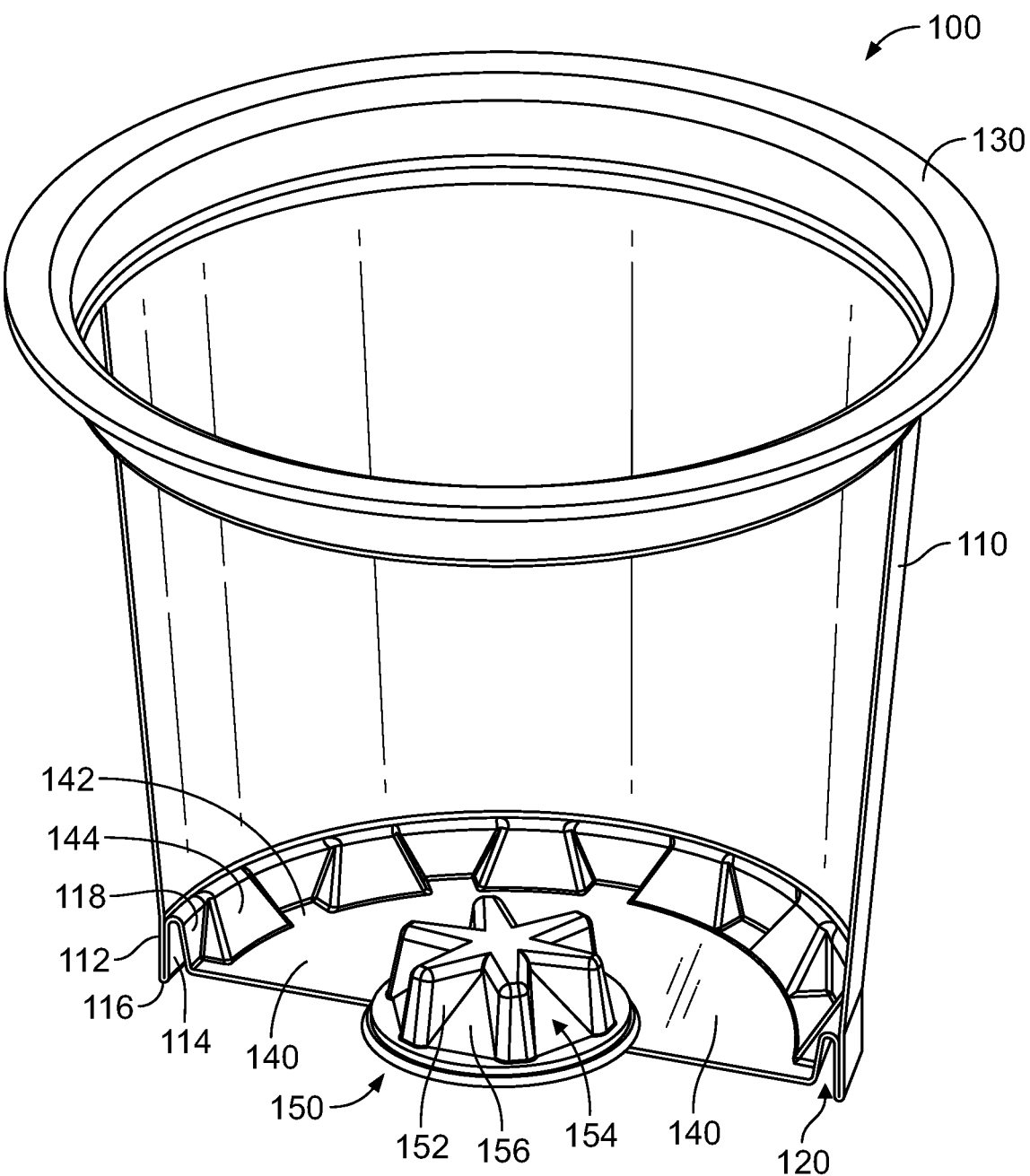
FIG. 1D is a another perspective cutaway view of the interior of beverage container 100 shown in FIGS. 1A-C.
Figure 1E:
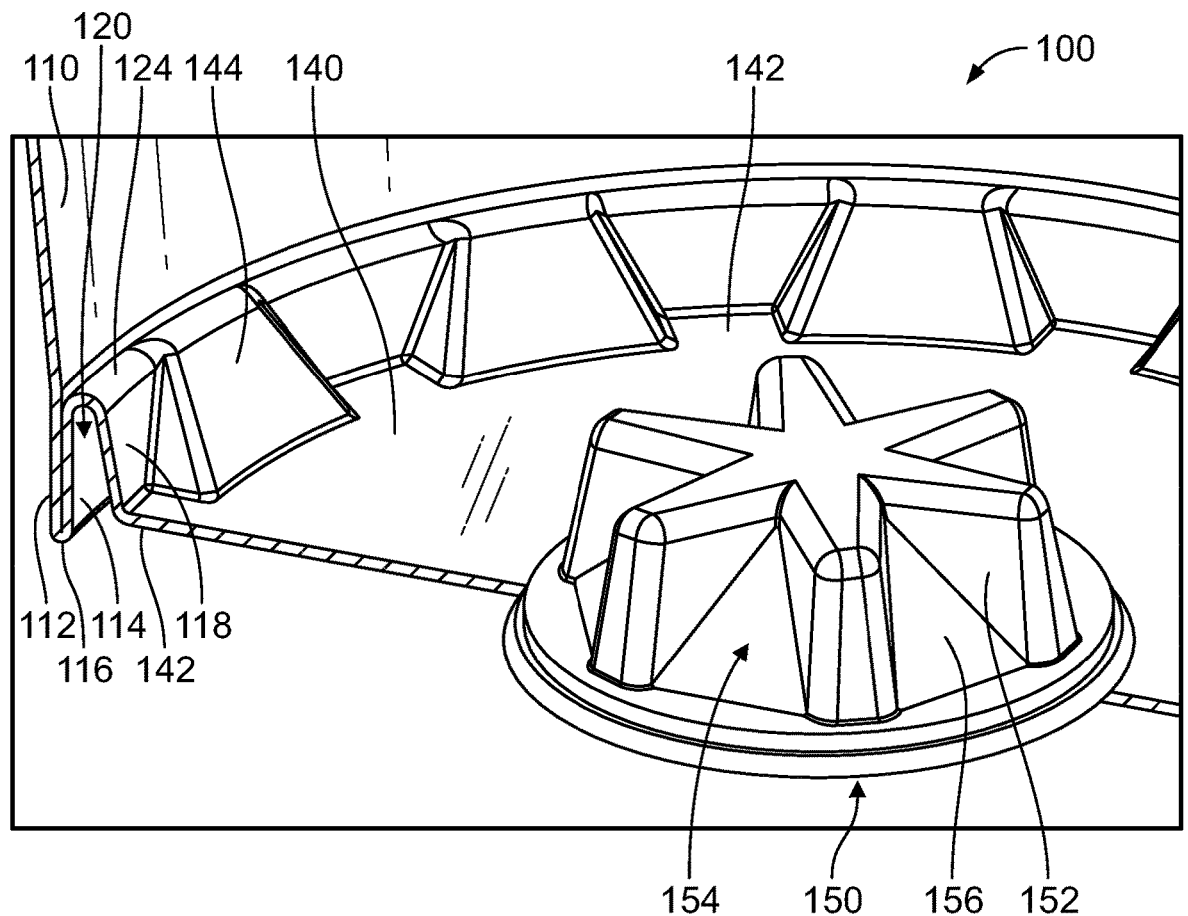
FIG. 1E is a close up view of the beverage container 100 shown in FIG. 1D.
Figure 1F:
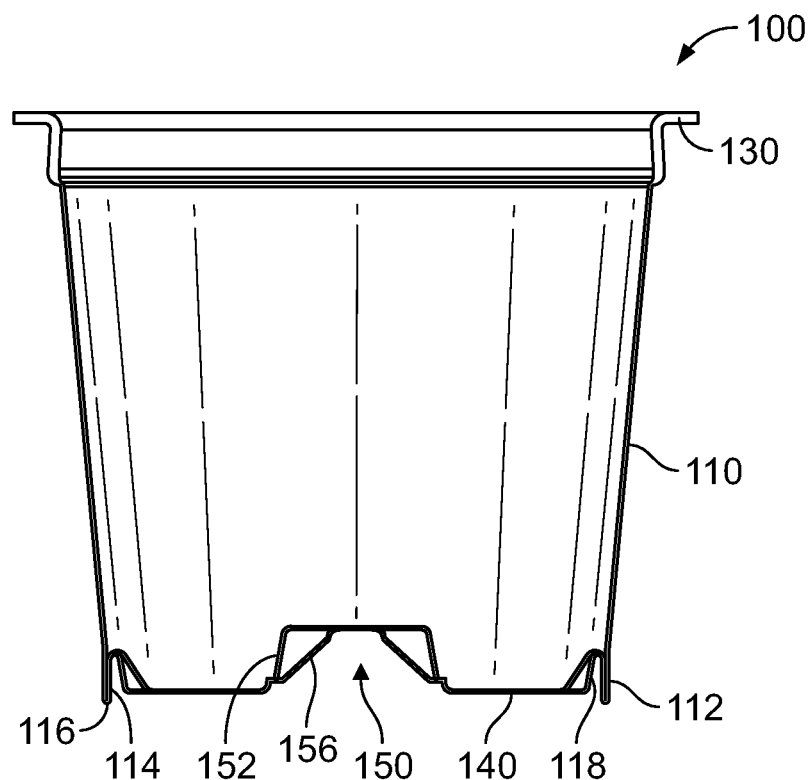
FIG. 1F is a partial cross-sectional side view of beverage container 100 shown in FIGS. 1A-E.
Figure 1G:
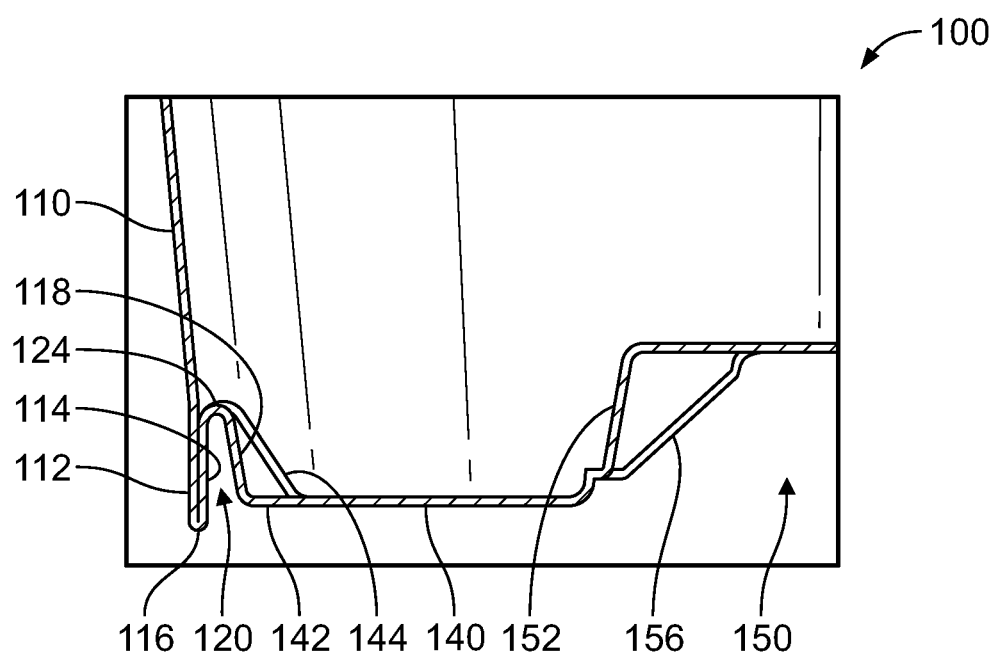
FIG. 1G is a close up view of beverage container 100 shown in FIG. 1F.

FIGS. 1A-G provide various views of beverage container 100. FIG. 1A is a perspective cutaway view of beverage container 100 and FIG. 1B is a close up view of FIG. 1A. FIG. 1C is another perspective cutaway view of beverage container 100. FIG. 1D is a another perspective cutaway view of the interior of beverage container 100, FIG. 1E is a close up view of the beverage container 100 shown in FIG. 1D, FIG. 1F is a partial cross-sectional side view of beverage container 100, and FIG. 1G is a close up view of beverage container 100 shown in FIG. 1F.

Beverage container 100 includes a hollow side wall 110 with a flange 130 positioned at the top of beverage container 100 and flange 130 serves to properly align beverage container 100 in a desired position within a beverage dispenser.

At the lower end of side wall 110 there is a first wall 112 extending to a bottom 116 of the beverage container 100 where first wall transitions to second wall 114 that extends upwardly along inner surface of first wall 112 into the interior the hollow side wall 110. In this embodiment there is no gap between the second wall 114 and the inner surface of the first wall 112. A third wall 144 having portion 118 beneath rib 142 extends downwardly and inwardly from second wall 114 through rounded transition area 124 between second wall 114 and third wall 144 and third wall portion 118, and third wall 144 and third wall portion 118 extends to base 140. In addition, a plurality of spaced ribs 142 extend outwardly from third wall 144 above third wall portion 118, having a spacing positioned between ribs 142. Ribs 142 do not extend all the way to second wall 114 such that gap 120 extends around an entire circumference of the beverage container between second wall 114 and third wall 144 and third wall portion 118. As shown in FIGS. 1E and 1F, bottom 116 of beverage container 100 is at the transition of the first wall 112 to second wall 114, and bottom 116 extends slightly below base 140 when viewed from the side as shown in those Figures.

The length of the first wall 112 which is the bottom of side wall 110 is defined as the length of the second wall 114. Third wall 144 may advantageously be of a length that is +/−25% of the length of the second side wall so that a triple wall is created at the bottom of the beverage container 100 by first wall 112, second wall 114 and third wall 144, thereby providing desired strength and rigidity at the bottom of the beverage container 100 to withstand the forces encountered during the piercing process.

The configuration of beverage container 100 having a double wall formed of first wall 112 and second wall 114 provides rigidity and strength to beverage container 100 during a piercing process where base 140 is punctured between center portion 150 of base 140 and the third wall 144 and third wall portion 118. Furthermore, center portion 150 is provided with a plurality of spaced ridges 152 that extend upwardly and outwardly above base 140. Spaces 154 are provided between ridges 152 above angled, raised surfaces 156 between ridges 152. The spaced ridges 152 in the center portion 150 of base 140 also provide strength and rigidity to the beverage container during the piercing process.

As the base 140 is pierced from below, upward movement of the base 140 forces an outer surface of second wall 114 to exert a force against an inner surface of first wall 112. At the same, time ridges 152 in center portion 150 counteract forces imparted during the piercing process. As a result of these features, beverage container 100 does not get crushed during the piercing process and the side wall does not split thereby preventing coffee grounds or other contents to seep out of the beverage container.

As shown in FIGS. 1F and 1G, the intersection of first wall 112 and second wall 114 may be positioned at the bottom-most portion on the periphery of the beverage container 100.

Beverage container 100 may be made during a thermoforming process using a sheet of material that includes polypropylene. The sheet may have a thickness on the order of 15-60 mils During a thermoforming operation, the flange 130, side wall 110, first wall 112, and base 140 may be formed, followed by the step of moving a plate upwardly to form the second wall 114 and third wall 144 and gap 120 therebetween, as well as ribs 142 and third wall portion 118 beneath ribs 142. At the same time the second and third walls are formed (or a different time), ridges 152 and spaces 154 in center portion 150 may be formed. It is not possible to form a double wall with first and second walls that have no gap therebetween during a single injection molding operation. As a result, thermoforming may be advantageously used to form beverage container 100 in a two-step process.

In addition, the physical properties of polypropylene may make it difficult to withstand the forces encountered during the piercing process without failing. However, the present configuration of beverage container 100 is designed to provide a beverage container made of, or containing, polypropylene that can withstand the forces encountered during the piercing process. Of course, beverage container 100 could also be made of other plastic material such as polystyrene, Polyethylene Terephthalate (PET), or other rigid plastic materials.

It will be appreciated that a greater or lesser number of ribs 142 could be provided, and the ribs 142 could be wider or less wide. Ribs 142 are shown to be symmetrical in size and position, but ribs 142 could also have different shapes and sizes and be positioned in a non-symmetrical manner.

It should also be noted that beverage container may not include ribs 142 extending from third wall 144, and third wall could extend downwardly from transition area 124 on the top of second side wall 114 in a sloped curve to base 140, such as is shown in third wall 144 between ribs 142 (as shown in FIG. 1D) as an example. It will also be appreciated that different geometries and configurations may be used for beverage container 100, including the area of center portion 150 where ridges 152 and spaces 154 could be provided with different geometries and configurations. For example, beverage container 100 is shown with six symmetrically shaped and positioned ridges 152 and six angled raised surfaces 156 positioned between ridges 152, although a greater or lesser number of ridges could be used, having different shapes and heights. In addition, a greater or lesser number of angled raised surfaces 156 could be used having different angles, different shapes, different sizes, and positions. The ridges 152 could also be symmetric in size and position, but could also be unsymmetrical in size and position.

Figure 1H:
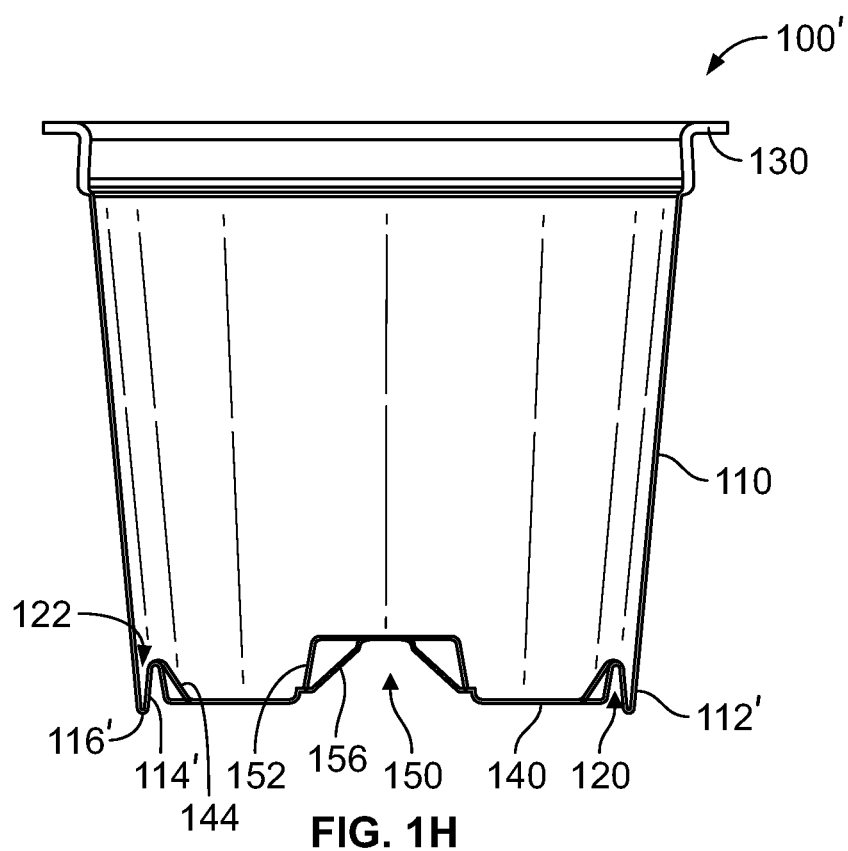
FIG. 1H is a partial cross-sectional side view of beverage container 100', according to an example embodiment.
Figure 1I:
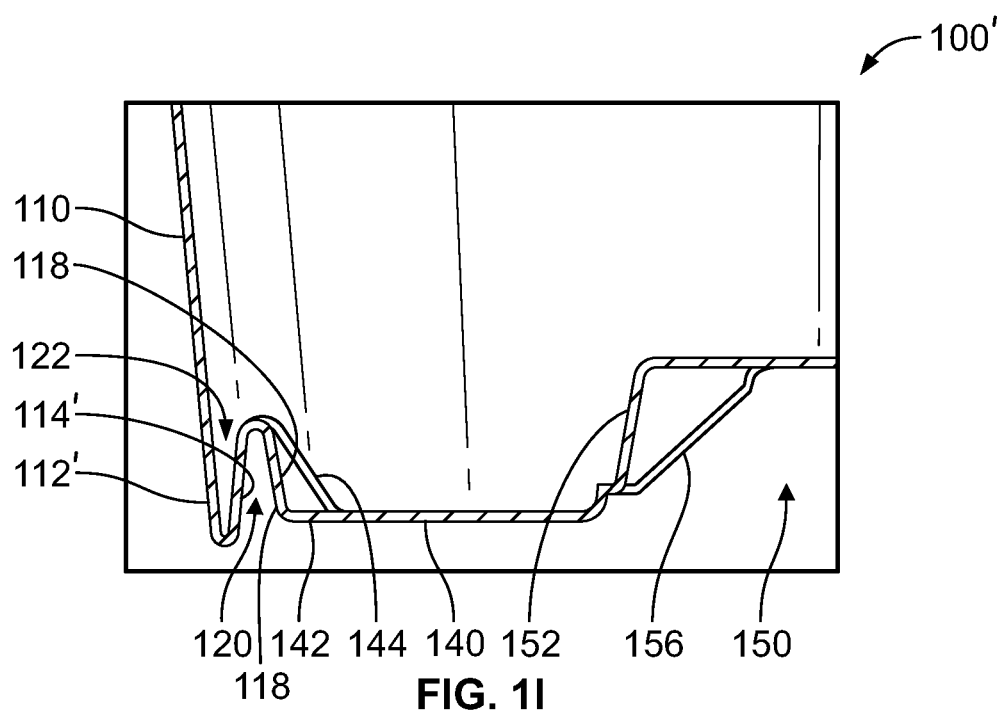
FIG. 1I is a close up view of beverage container 100' shown in FIG. 1H.

FIG. 1H is a partial cross-sectional side view of beverage container 100', and FIG. 1I is a close up view of beverage container 100' shown in FIG. 1H. Beverage container 100' is configured the same as beverage container 100 described above, but has several differences on the bottom. In particular, beverage container 100' has a first wall 112' at the bottom of side wall 110 and a gap 122 exists between an inner surface of first wall 112' and second wall 114'. A bottom 116' of beverage container 100' is a transition between the first wall 112' and the second wall 114'. Because there is a gap 122 between first wall 112' and second wall 114', third wall 144' extends downwardly from second wall 114' at a slightly different angle than third wall 144 of beverage container 100. The remainder of beverage container 100' is otherwise configured the same as beverage container 100.

Beverage container 100' may be made of or contain polypropylene, or other materials as noted above with respect to beverage container 100. In addition, beverage container 100' could be made through a thermoforming operation. Alternately, beverage container 100' has a gap 122 between the first wall 112' and the second wall 114' and can be injection molded as well.

Figure 2A:
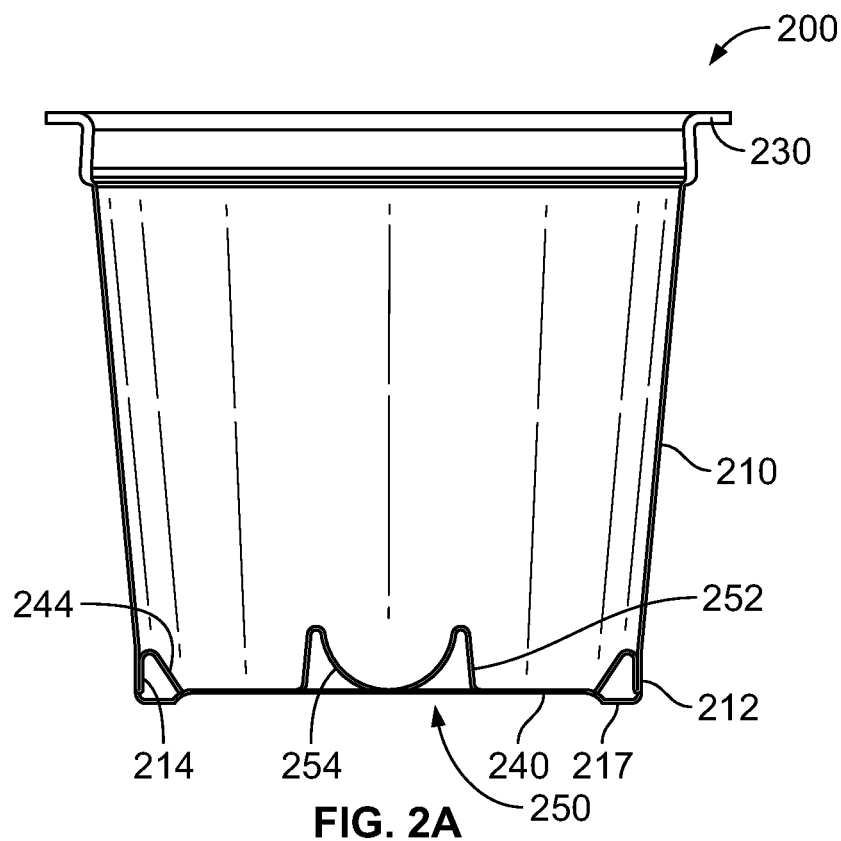
FIG. 2A is a partial cross-sectional side view of beverage container 200, according to an example embodiment.
Figure 2B:
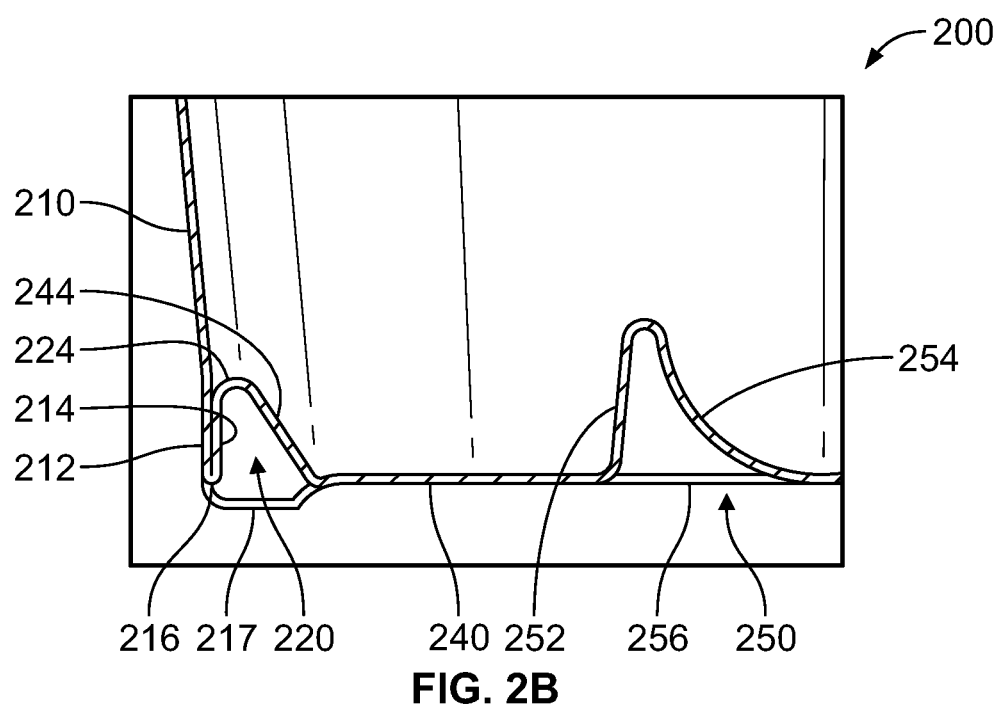
FIG. 2B is a close up view of beverage container 200 shown in FIG. 2A.
Figure 2C:
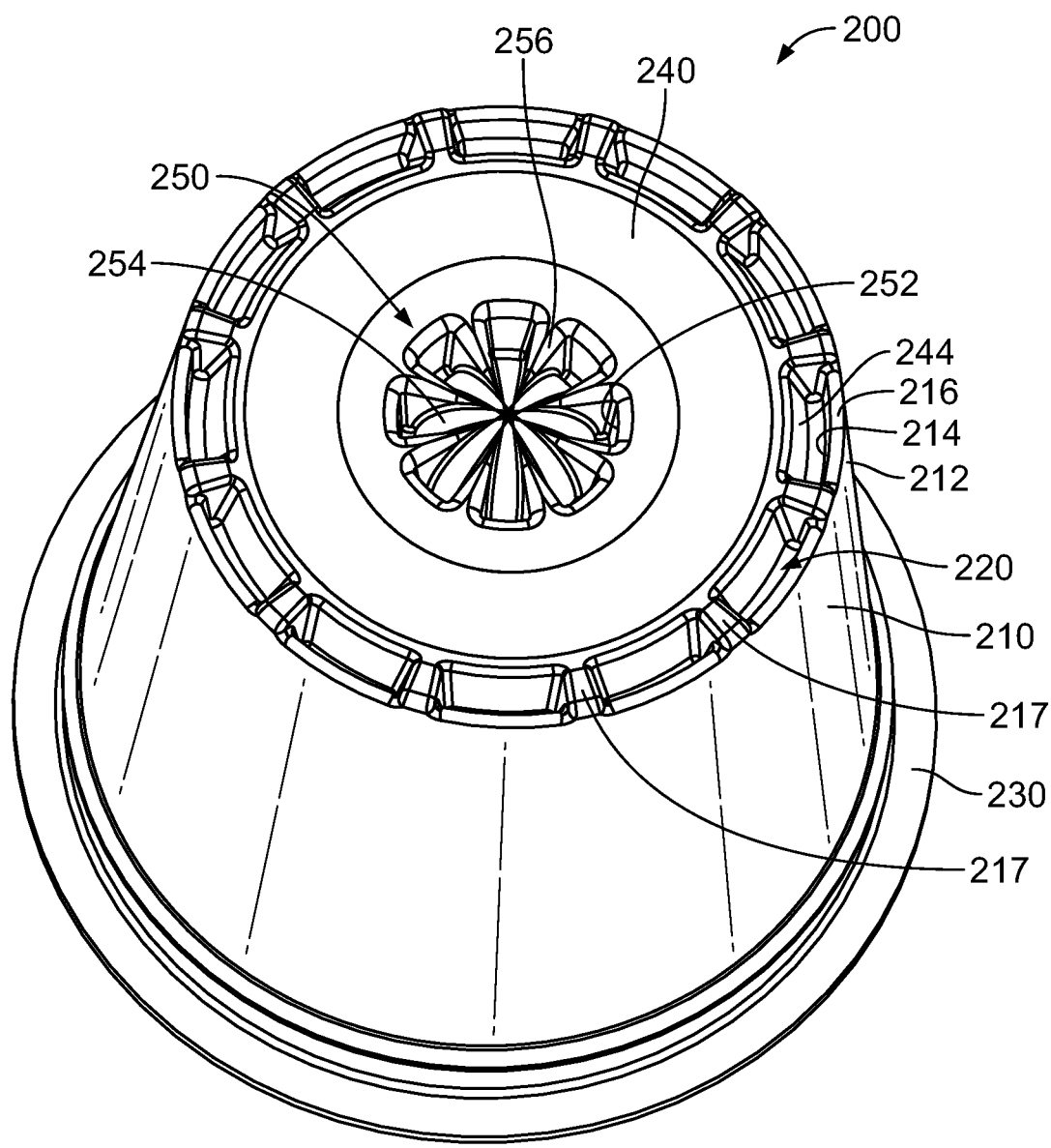
FIG. 2C is a perspective bottom view of beverage container 200 shown in FIGS. 2A and 2B.
Figure 2D:
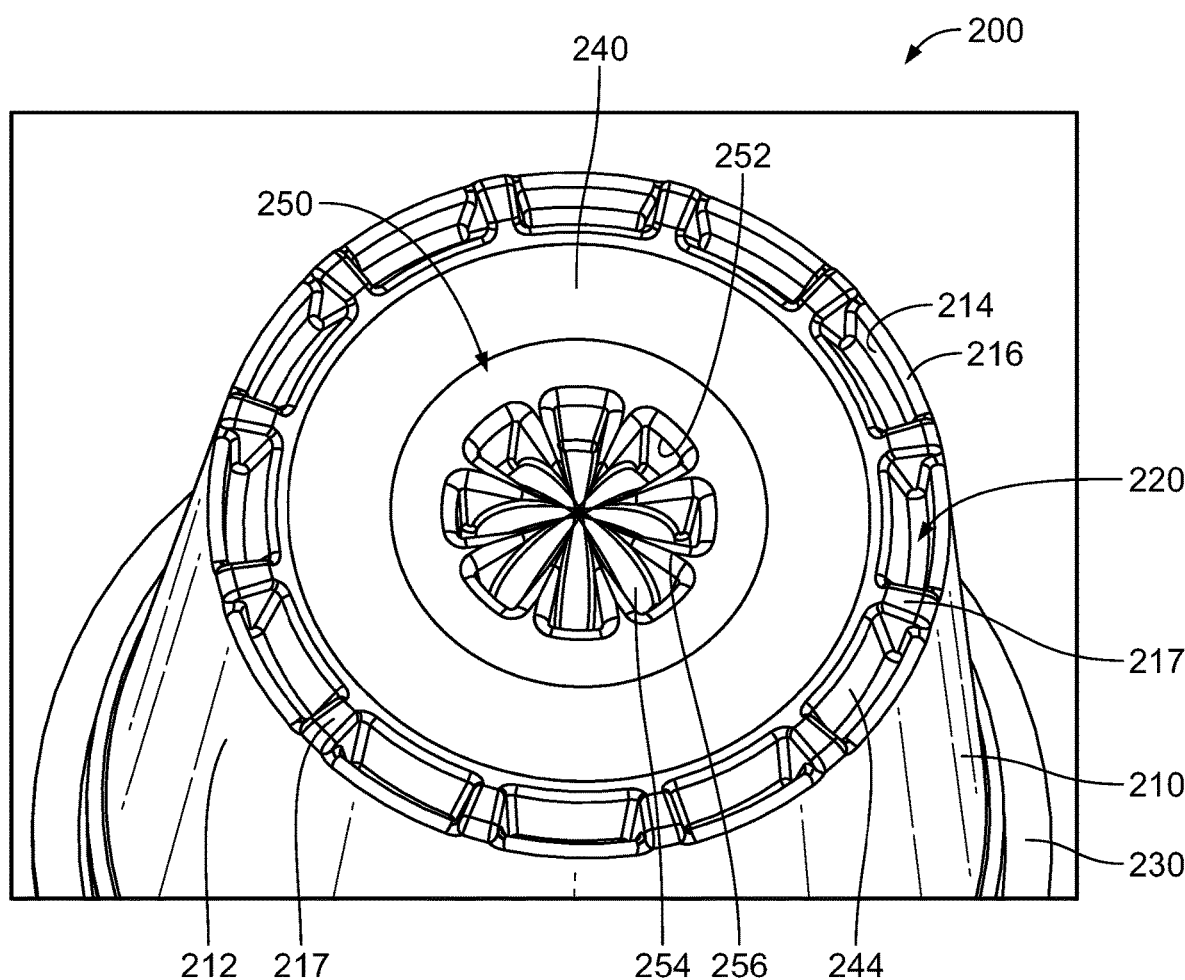
FIG. 2D is a close up view of beverage container 200 shown in FIGS. 2A-C.
Figure 2E:
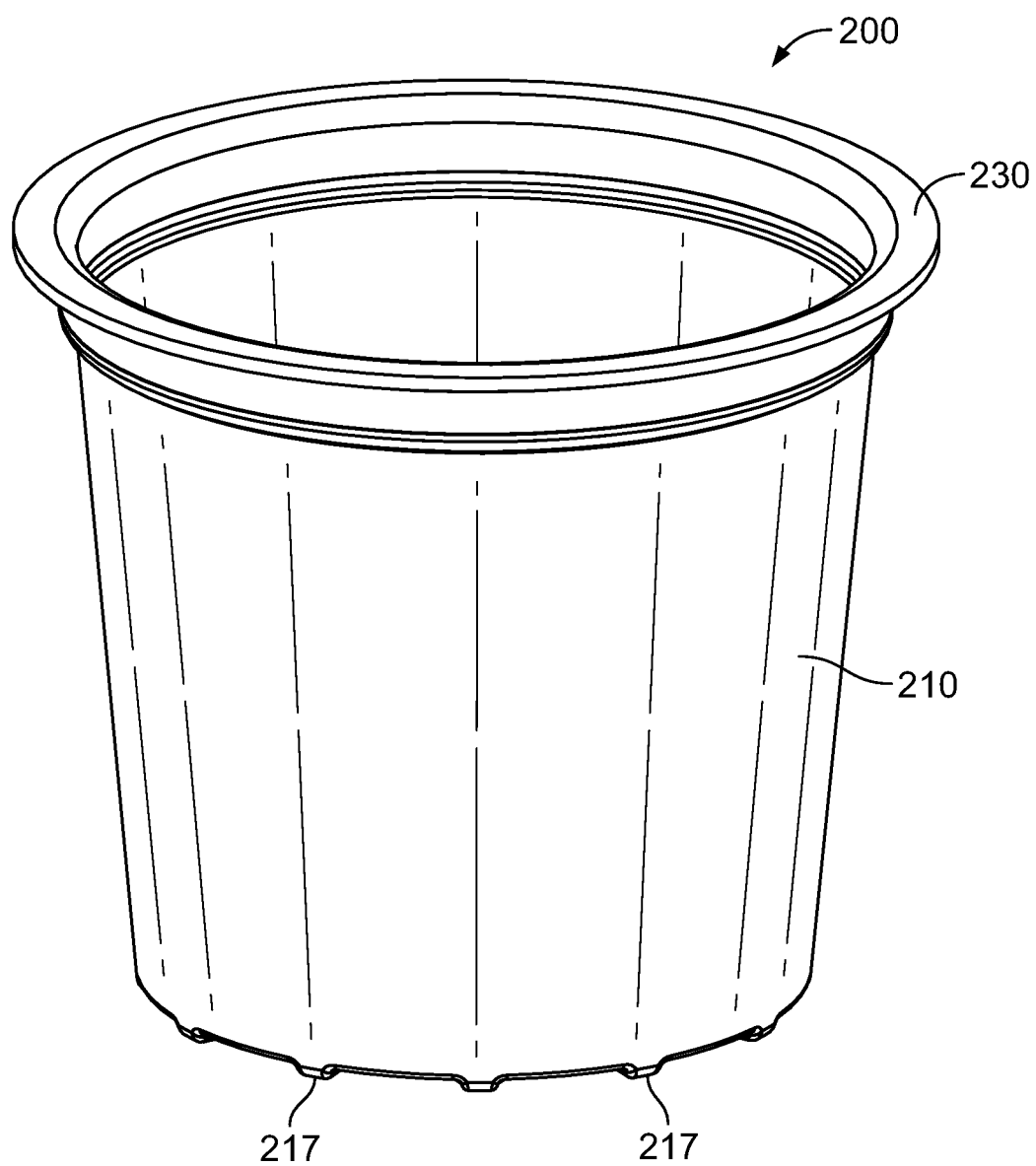
FIG. 2E is a perspective side view of beverage container 200 shown in FIGS. 2A-D.

FIGS. 2A-E show various views of beverage container 200. FIG. 2A is a partial cross-sectional side view of beverage container 200, according to an example embodiment and FIG. 2B is a close up view of beverage container 200 shown in FIG. 2A. FIG. 2C is a perspective bottom view of beverage container 200, FIG. 2D is a close up view of beverage container 200, and FIG. 2E is a perspective side view of beverage container 200 shown in FIGS. 2A-D.

Beverage container 200 is similar in configuration to beverage container 100 in many respects. The flange 230, side wall 210, first wall 212, second wall 214, and third wall 244, are the same as flange 130, side wall 110, first wall 112, second wall 114, and third wall 144 in beverage container 100 described above. In particular, beverage container 200 includes a hollow side wall 210 with a flange 230 positioned at the top of beverage container 200 and flange 230 serves to properly align beverage container 200 in a desired position within a beverage dispenser.

At the lower end of side wall 210 there is a first wall 212 extending to a transition point 216 where first wall transitions to second wall 214 that extends upwardly along inner surface of first wall 212 into the interior the hollow side wall 210. In this embodiment, as with beverage container 100, there is no gap between the second wall 214 and the inner surface of the first wall 212. A third wall 244 extends downwardly and inwardly from second wall 214 through rounded transition area 224 between second wall 214 and third wall 244 extends to base 240.

Beverage container 200 differs from beverage container 100 in that beverage container 200 has a plurality of spaced ribs 217 that extends all of the way from base 240 to first wall 212. In beverage container 200, ribs 217 are positioned lower than base 240 such that the ribs are at the bottom most point on the beverage container 200, and not the transition point 216 where first wall 212 transitions into second wall 214. Ribs 217 are shown extending beneath the base of beverage container 200 in FIG. 2E. In addition, as shown in FIGS. 2C and 2D, a plurality of gaps 220 extend between ribs 217. As shown in FIGS. 2A and 2B, the bottom-most point on beverage container 200 is where first wall 212 extends to rib 217.

As with beverage container 100, the configuration of beverage container 200 having a double wall formed of first wall 212 and second wall 214 and spaced ribs 217 provides rigidity and strength to beverage container 200 during a piercing process where base 240 is punctured between center portion 250 of base 240 and the third wall 244.

In addition, unlike beverage container 100, center portion 250 of beverage container 200 is provided with a plurality of spaced ridges 252 that extend upwardly and outwardly above base 240 and slope downwardly along curved surface 254 to the center of base 150. Spaces above base portion 256 are provided between ridges 252. The spaced ridges 152 with downwardly sloping surfaces 254 in the center portion 250 of base 240 also provide strength and rigidity to the beverage container during the piercing process.

As is the case with beverage container 100, as the base 240 is pierced from below, upward movement of the base 240 forces an outer surface of second wall 214 exerts a force against an inner surface of first wall 212. At the same time, ridges 252 in center portion 250 counteract forces imparted during the piercing process. As a result of these features, beverage container 200 does not get crushed during the piercing process and the side wall does split thereby preventing coffee grounds or other contents to seep out of the beverage container.

Like beverage container 100, beverage container 200 may be made during a thermoforming process using a sheet of material that includes polypropylene. During a thermoforming operation, the flange 230, side wall 210, first wall 212, and base 240 may be formed, followed by the step of moving a plate upwardly to form the second wall 214, third wall 244, ribs 217, and gap 220 between the ribs. At the same time (or a different time), ridges 252 and sloped walls 254 in center portion 250 may be formed. It is not possible to form a double wall with first and second walls that have no gap therebetween during a single injection molding operation. As a result, thermoforming may be advantageously used to form beverage container 200 in a two-step process.

In addition, the physical properties of polypropylene may make it difficult to withstand the forces encountered during the piercing process without failing. However, the present configuration of beverage container 200 is designed to provide a beverage container made of or containing polypropylene that can withstand the forces encountered during the piercing process. Of course, beverage container 200 could also be made of other plastic material such as polystyrene, Polyethylene Terephthalate (PET), or other rigid plastic materials.

It will be appreciated that a greater or lesser number of ribs 217 could be provided, and the ribs 217 could be wider or less wide. Ribs 217 are shown to be symmetrical in size and position, but ribs 217 could also have different shapes and sizes and be positioned in a non-symmetrical manner. It should also be noted that the third wall could extend downwardly from transition area 224 on the top of second side wall 214 in a sloped curve to base 240.

It will be appreciated that different geometries and configurations may be used for beverage container 200, including the area of center portion 250 where ridges 252 and sloped walls 254 could be provided with different geometries and configurations. For example, beverage container 200 is shown with eight symmetrically shaped and positioned ridges 252 and eight sloped walls 254 with spaces positioned between ridges 252 above base portion 256, although a greater or lesser number of ridges and sloped wall could be used, having different shapes and heights. The ridges 252 and sloped walls 254 could also be symmetric in size and position, but could also be unsymmetrical in size and position. Additionally, the ridges and angled sections of beverage container 100 could be used on beverage container 200 instead of the configuration shown. Similarly, the ridges and sloped walls on the center portion 250 could be used on beverage container 100.

Figure 2F:
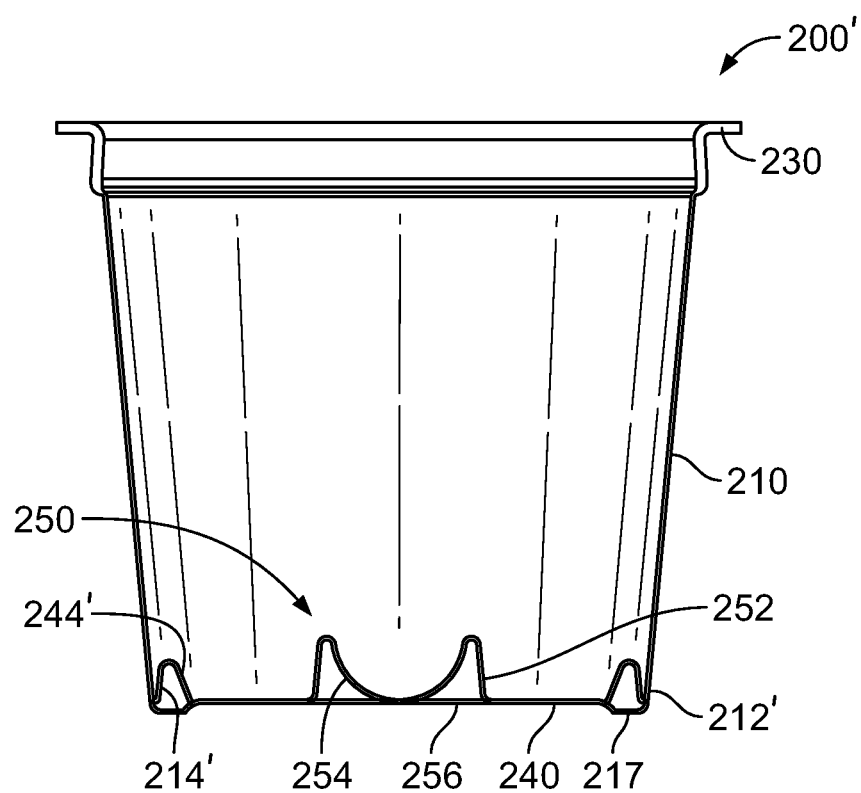
FIG. 2F is a partial cross-sectional side view of beverage container 200', according to an example embodiment.
Figure 2G:
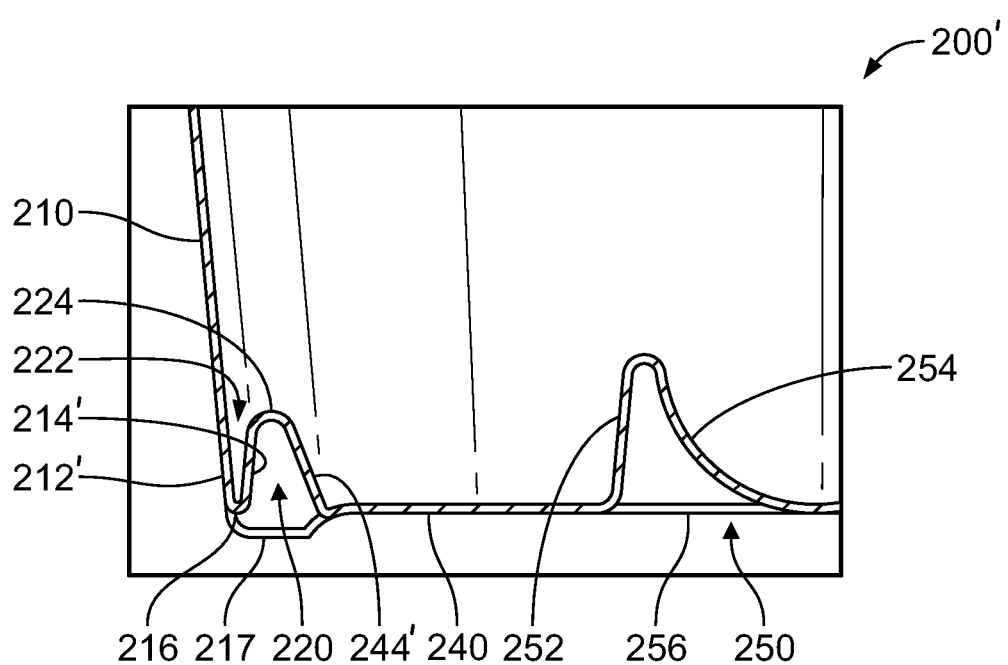
FIG. 2G is a close up view of beverage container 200' shown in FIG. 2F.
Figure 2H:
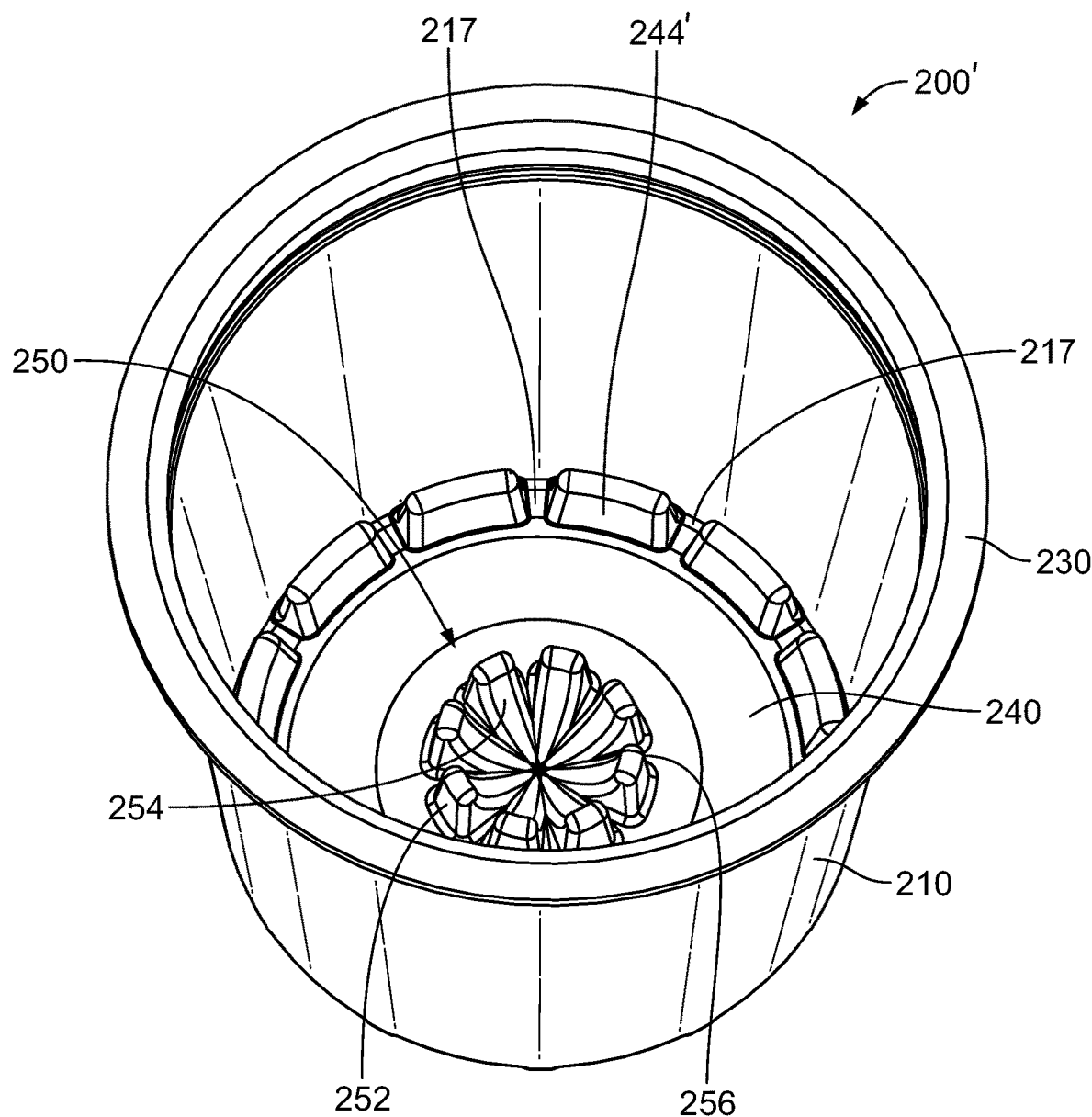
FIG. 2H is a perspective top view of beverage container 200' shown in FIGS. 2F and 2G.
Figure 2I:
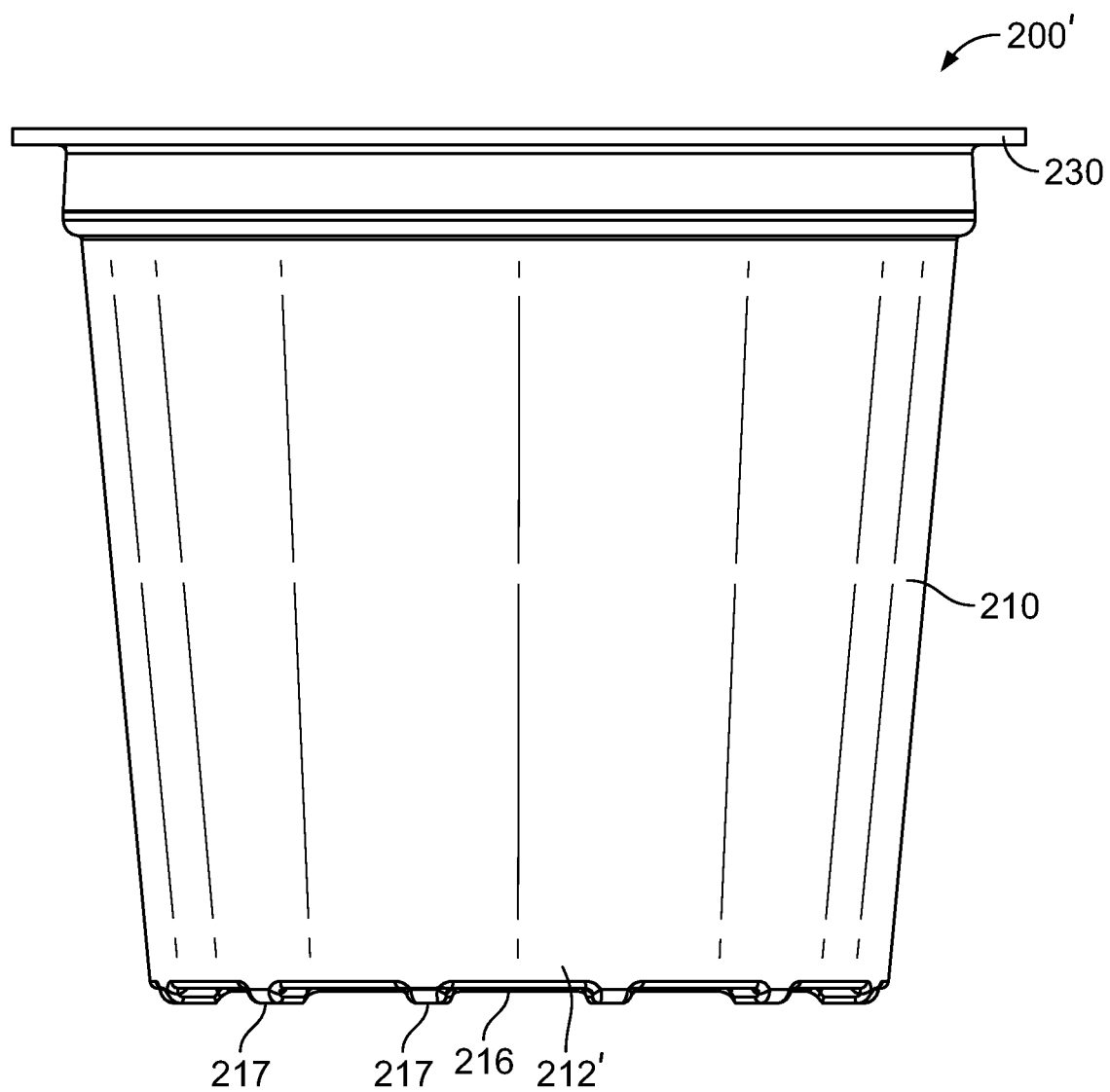
FIG. 2I is a side view of beverage container 200' shown in FIGS. 2F-H.

FIGS. 2F-I illustrate beverage container 200'. FIG. 2F is a partial cross-sectional side view of beverage container 100', FIG. 2G is a close up view of beverage container 200', FIG. H is a perspective interior view of beverage container 200', and FIG. 2I is a side view of beverage container 200'. Beverage container 200' is configured the same as beverage container 200 described above, but has several differences on the bottom. In particular, beverage container 200' has a first wall 212' at the bottom of side wall 210 and a gap 222 exists between an inner surface of first wall 212' and second wall 214'. Because there is a gap 222 between first wall 212' and second wall 214', third wall 244' extends downwardly from second wall 214' at a slightly different angle than third wall 244 of beverage container 200. Ribs 217 extend at the bottom of beverage container 200' beneath the base 240 and transition point 216 between the first wall 212' and the second wall 214', as shown in FIGS. 2G and 2I. The remainder of beverage container 200' is otherwise configured the same as beverage container 200.

Beverage container 200' may be made of polypropylene, or other materials as noted above with respect to beverage container 200. In addition, beverage container 200' could be made through a thermoforming operation. Alternately, beverage container 200' has a gap 222 between the first wall 212' and the second wall 214' and can be injection molded as well.

Figure 2J:
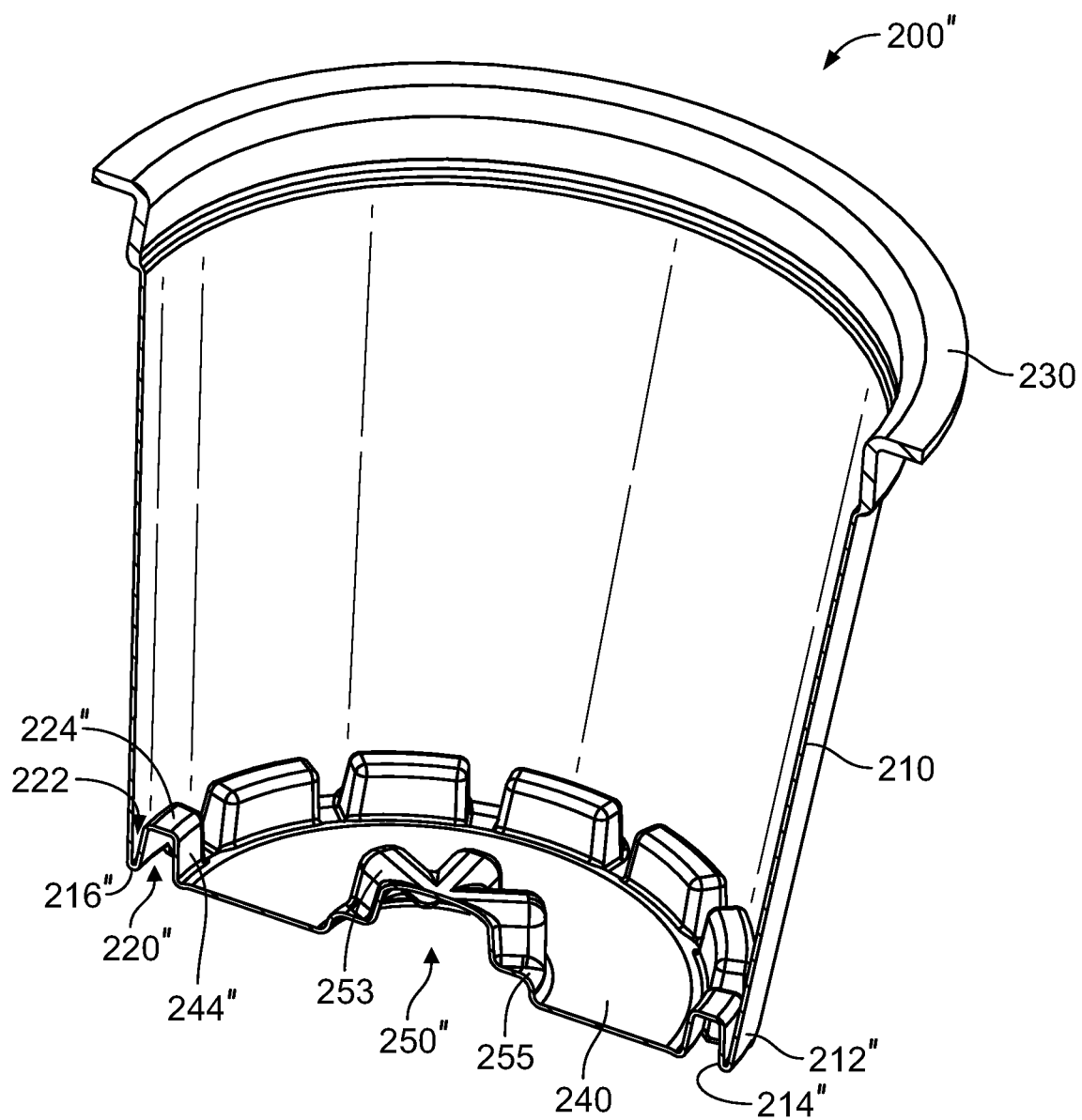
FIG. 2J is a perspective cross-sectional view of beverage container 200", according to an example embodiment.

FIG. 2J is a perspective cross-sectional view of beverage container 200", according to an example embodiment. Beverage container 200" is configured the same beverage container 200', except there is longer, flat transition area 224" between second wall 214" and third wall 244", and above gap 220" between second wall 214" and third wall 244". As with beverage container 200', beverage container 200" includes a gap 222 between first wall 212" and second wall 214" above transition 216".

In addition, beverage container 200" has a different center portion 250" than beverage container 200', and which is similar to center portion 150 of beverage container 100. Center portion 250" includes a plurality of ridges 253 and lower surfaces 255 positioned between the ridges. Lower surfaces 255 could be angled upwardly like center portion 150 of beverage container. It will be appreciated that there could greater or fewer ridges and lower surfaces, and the ridges could be symmetrical or non-symmetrical. In addition, any of the center portions shown in beverages containers 100, 100', 200, 200', and 200" could be used on any of the afore-mentioned beverage container.

In addition, beverage container 200" may be made of, or contain, polypropylene, or other materials as noted above with respect to beverage container 200. In addition, beverage container 200" could be made through a thermoforming operation. Alternately, beverage container 200" has a gap 222 between the first wall 212" and the second wall 214" and can be injection molded as well.

In addition, while beverage containers 100, 100', 200, 200', and 200" are useful as a single serve beverage container, the containers are not limited to containing coffee grounds, tea leaves, cocoa and the like, but may also be used as in different configurations which can be used a container for other food and drink products as well, such as soup; and could also be used a drink holder and serve as a cup to hold liquid.

We claim:

1. A container, comprising:
a side wall having a hollow interior;
an outwardly extending flange positioned above an upper end of the side wall;
a first wall, a second wall, and a third wall positioned on a bottom of the container;
wherein the first wall is positioned on a lower end of the side wall;
wherein the second wall extends upwardly from the first wall into the hollow interior of the side wall;
wherein the third wall extends inwardly and downwardly from the second wall; and
a base extending inwardly from the third wall; and
wherein a gap exists between the first wall and the second wall.

2. A container, comprising:
a side wall having a hollow interior;
an outwardly extending flange positioned above an upper end of the side wall;
a first wall, a second wall, and a third wall positioned on a bottom of the container;
wherein the first wall is positioned on a lower end of the side wall;
wherein the second wall extends upwardly from the first wall into the hollow interior of the side wall;

wherein the third wall extends inwardly and downwardly from the second wall; and a base extending inwardly from the third wall;

wherein the first wall is contiguous with the second wall; and wherein there is no gap between the second wall and an inner surface of the first wall.

3. A container, comprising:

a side wall having a hollow interior;

an outwardly extending flange positioned above an upper end of the side wall;

a first wall, a second wall, and a third wall positioned on a bottom of the container;

wherein the first wall is positioned on a lower end of the side wall;

wherein the second wall extends upwardly from the first wall into the hollow interior of the side wall;

wherein the third wall extends inwardly and downwardly from the second wall; and a base extending inwardly from the third wall; and wherein a gap exists between the second wall and the third wall that extends around an entire area between the second wall and the third wall.

4. The container of claim 3, wherein a plurality of spaced apart ribs extend from the third wall towards the second wall.

5. The container of claim 1, wherein the beverage container is formed through a thermoforming operation.

6. A container, comprising:

a side wall having a hollow interior;

an outwardly extending flange positioned above an upper end of the side wall;

a first wall, a second wall, and a third wall positioned on a bottom of the container;

wherein the first wall is positioned on a lower end of the side wall;

wherein the second wall extends upwardly from the first wall into the hollow interior of the side wall;

wherein the third wall extends inwardly and downwardly from the second wall; and a base extending inwardly from the third wall;

wherein a plurality of ridges extend upwardly from a central portion of the base into the hollow interior of the side wall.

7. The container of claim 6, wherein a plurality of angled raised surfaces extend between the plurality of ridges.

8. The container of claim 1, wherein a plurality of spaced apart ribs extend from the third wall to the first wall and span across an entire distance between the third wall and the second wall.

9. The container of claim 1, wherein the beverage container comprises polypropylene.

10. The container of claim 8, wherein no gap exists between an inner surface of the first wall and the second wall.

11. The container of claim 8, wherein a gap exists between the second wall and the third wall that extends between the plurality of spaced apart ribs.

12. The container of claim 9, wherein a flat transition portion extends between the second wall and the third wall.

13. The container of claim 8, wherein a plurality of ridges extend upwardly from a central portion of the base into the hollow interior of the side wall.

14. The container of claim 1, wherein the third wall has a length that +/−25% of a length of the second wall.

15. A method of forming a container having a side wall having a hollow interior, an outwardly extending flange positioned above an upper end of the side wall, a first wall, a second wall, and a third wall positioned on a bottom of the container, wherein the first wall is positioned on a lower end of the side wall, wherein the second wall extends upwardly from the first wall into the hollow interior of the side wall, wherein the third wall extends inwardly and downwardly from the second wall, and a base extending inwardly from the third wall, and wherein a gap exists between the first wall and the second wall comprising the steps of:

performing a first thermoforming step on a sheet of plastic material to form the side wall, the first wall and the base; and following the first thermoforming step with a second thermoforming step to form the second wall and the third wall.

16. The method of claim 15, further including forming a plurality of ridges in a central portion of the base during the first or second thermoforming operation.

17. The method of claim 15, wherein there is no gap between the second wall and an inner surface of the first wall.

18. The method of claim 15, wherein a gap is formed between the first wall and the second wall.

19. The method of claim 15, wherein a gap is formed between the second wall and the third wall that extends around an entire area between the second wall and the third wall.

20. The method of claim 19, wherein a plurality of spaced apart ribs extend from the third wall towards the second wall.

21. The method claim 15, wherein the container comprises polypropylene.

22. The method of claim 15, wherein a plurality of spaced apart ribs extend from the third wall to the first wall and span across an entire distance between the third wall and the second wall.

23. The method of claim 22, wherein there is no gap between the second wall and an inner surface of the first wall.

24. The method of claim 22, wherein a gap exists between the second wall and the third wall that extends between the plurality of spaced apart ribs.

* * * * *